Dec. 8, 1942.         C. G. STRANDLUND         2,304,383
REVERSIBLE MOLDBOARD PLOW
Filed Sept. 11, 1939         4 Sheets-Sheet 1
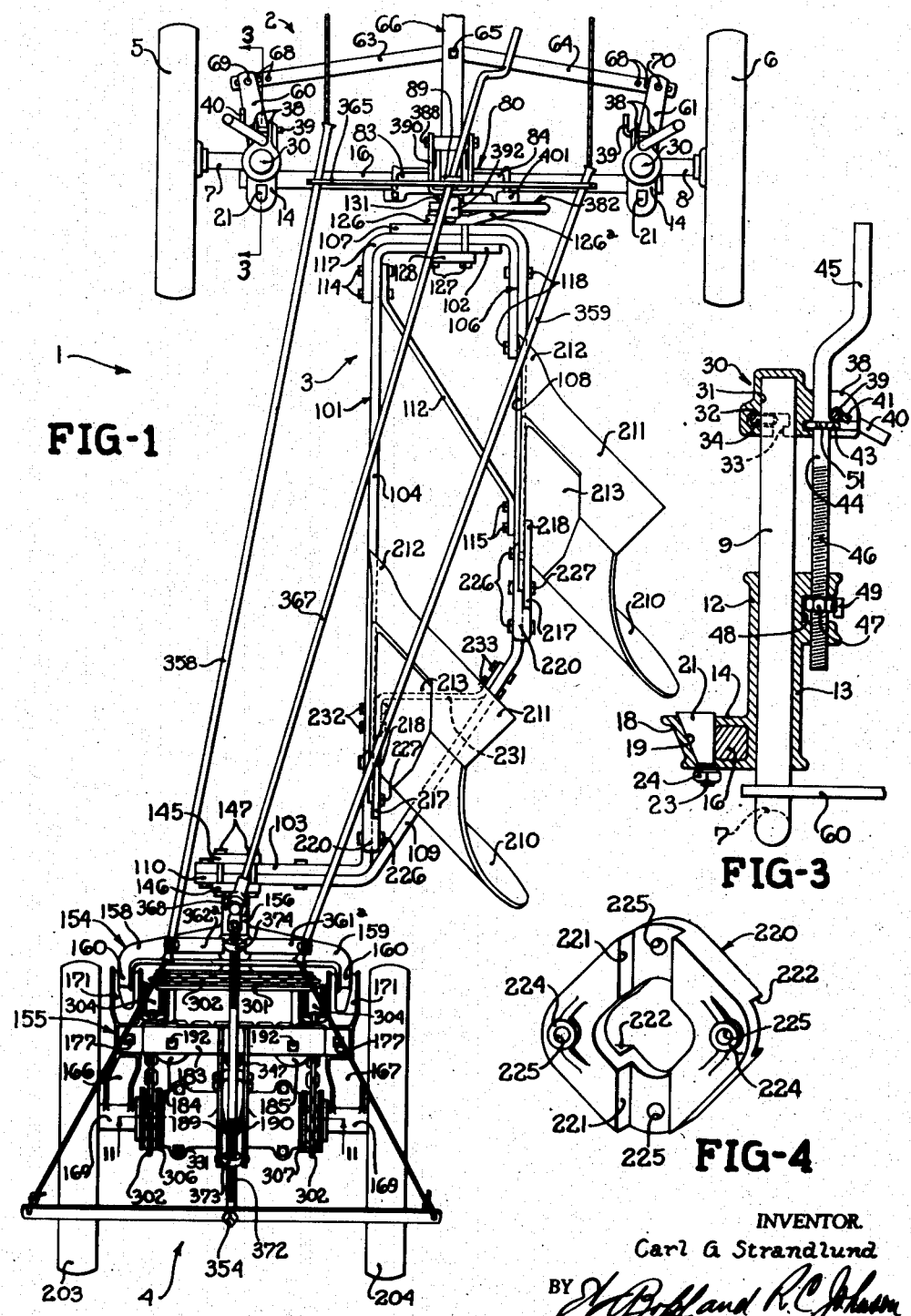
INVENTOR.
Carl G. Strandlund
BY
ATTORNEYS Dec. 8, 1942.  C. G. STRANDLUND  2,304,383
REVERSIBLE MOLDBOARD PLOW
Filed Sept. 11, 1939  4 Sheets-Sheet 2
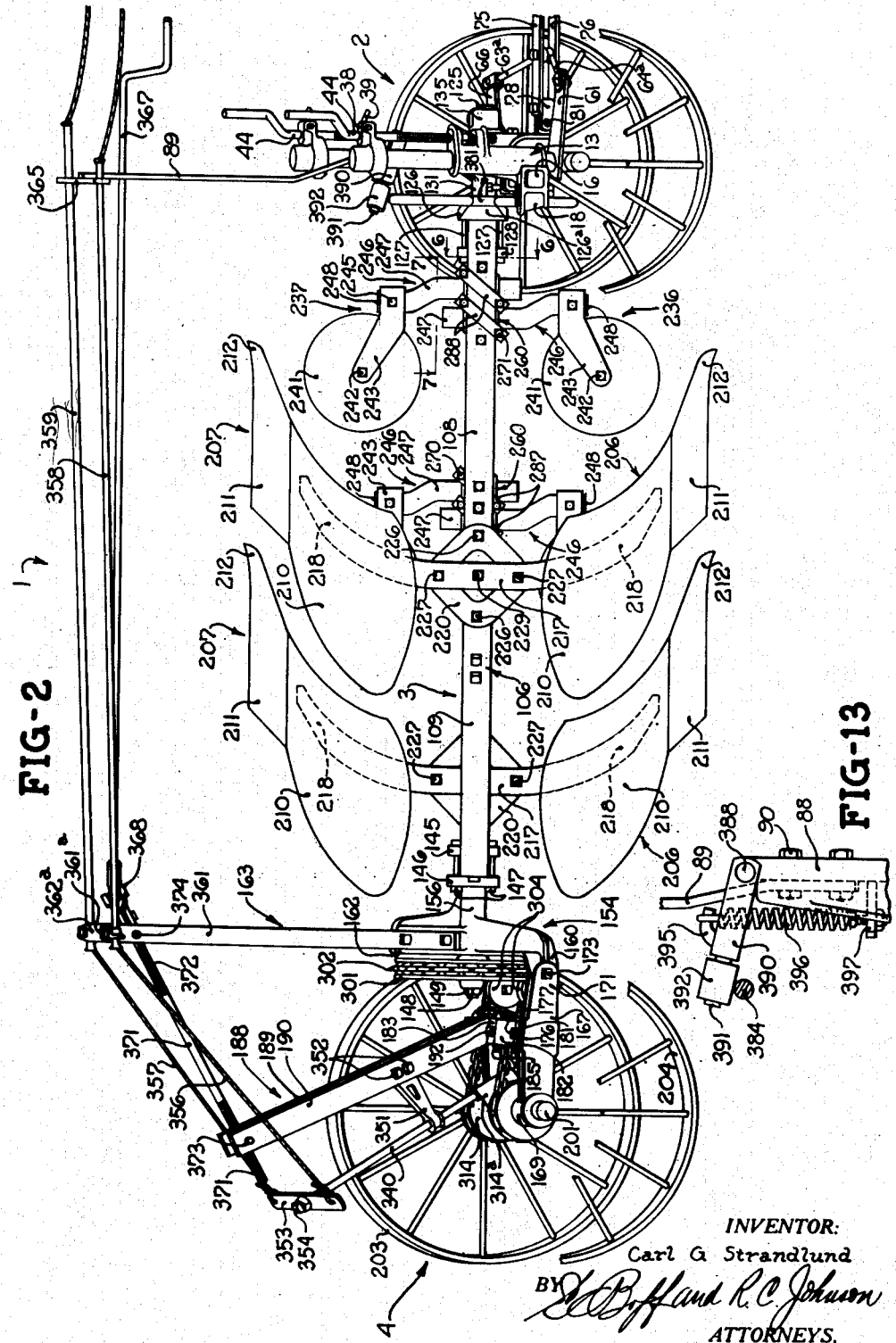
INVENTOR:
Carl G Strandlund
ATTORNEYS.

Dec. 8, 1942.  C. G. STRANDLUND  2,304,383
REVERSIBLE MOLDBOARD PLOW
Filed Sept. 11, 1939  4 Sheets-Sheet 3
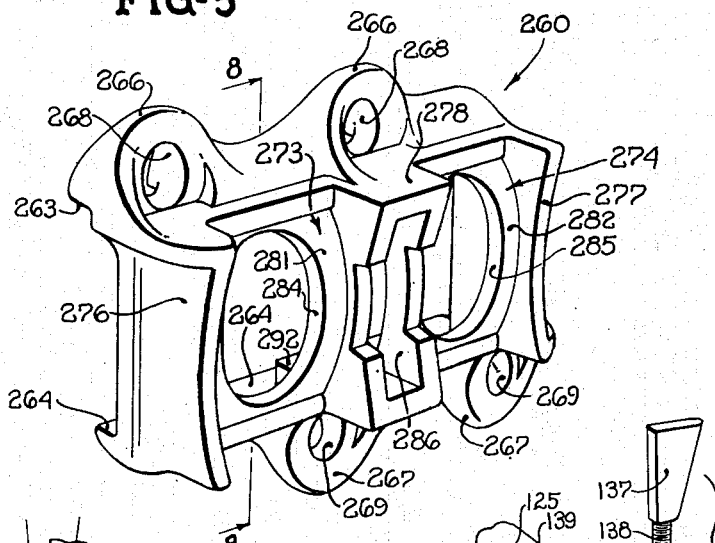
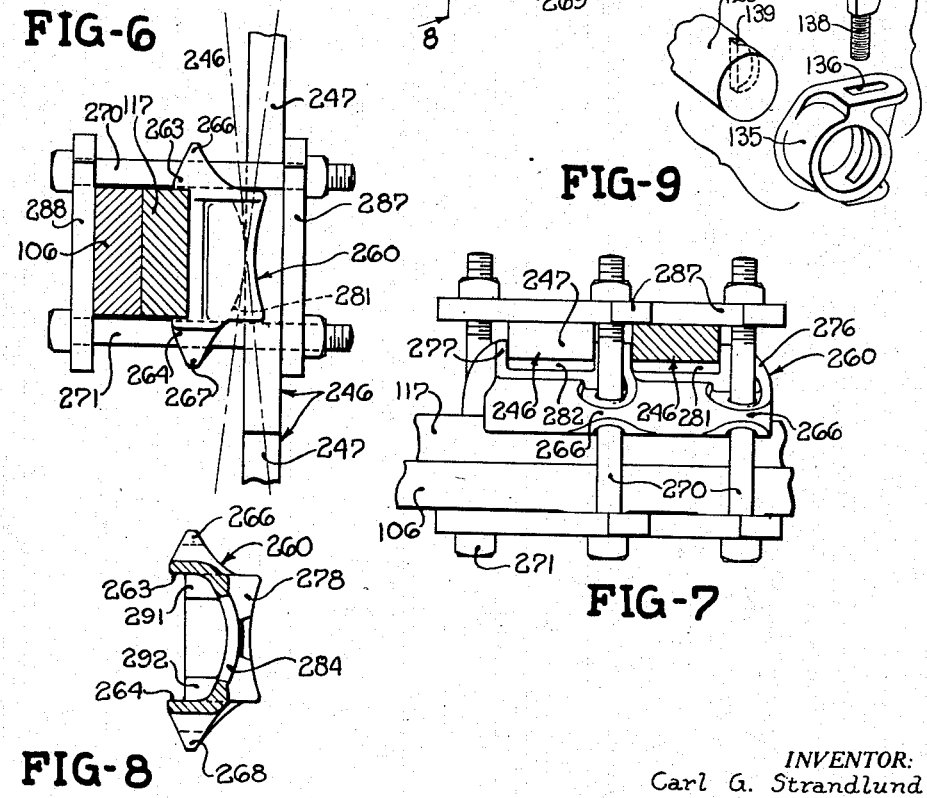
INVENTOR:
Carl G. Strandlund
ATTORNEYS.

Dec. 8, 1942.  C. G. STRANDLUND  2,304,383
REVERSIBLE MOLDBOARD PLOW
Filed Sept. 11, 1939   4 Sheets-Sheet 4
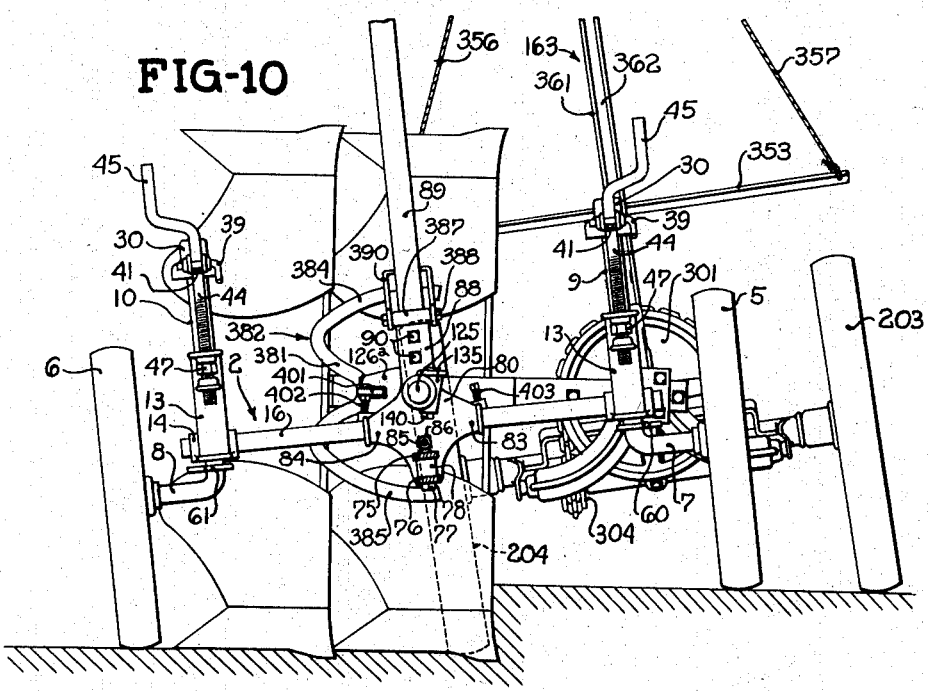
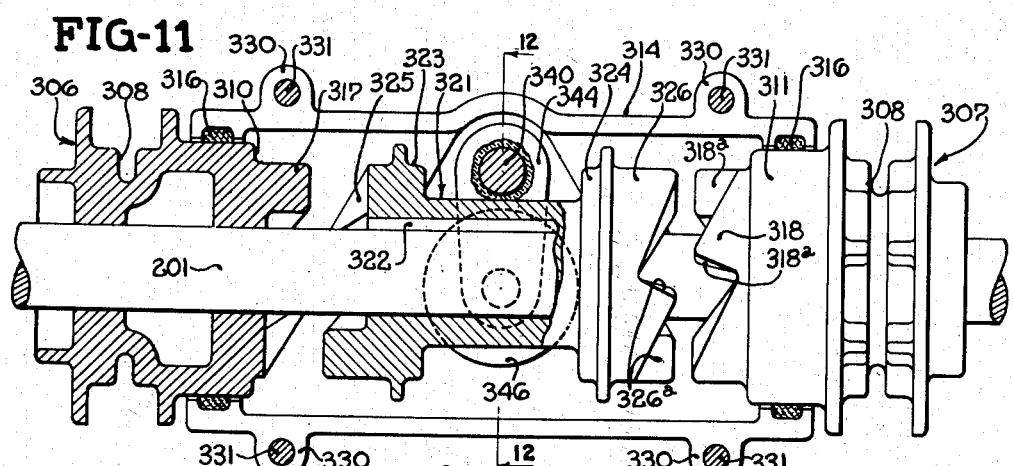
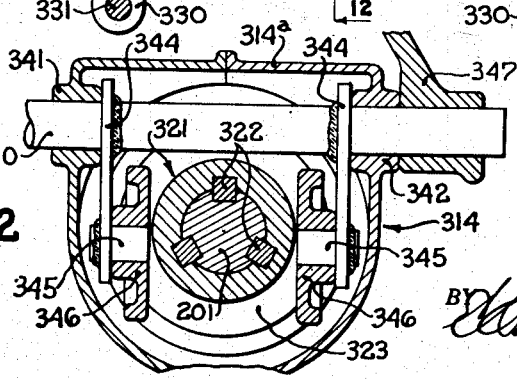
INVENTOR:
Carl G. Strandlund
ATTORNEYS.

Patented Dec. 8, 1942

2,304,383

UNITED STATES PATENT OFFICE 2,304,383

REVERSIBLE MOLDBOARD PLOW

Carl G. Strandlund, Moline, Ill., assignor to Deere & Company, Moline, Ill., a corporation of Illinois Application September 11, 1939, Serial No. 294,253

53 Claims. (Cl. 97—26)

The present invention relates generally to agricultural implements and more particularly to plows and like devices of the reversible type wherein the tool means, right and left hand plow units in the event the implement is a reversible plow, may be shifted from one position to another.

The object and general nature of this invention is the provision of a reversible moldboard plow wherein the rear end of the plow is supported on a rear truck unit which is placed a considerable distance rearwardly of the plow bottoms, whereby the weight of the rear truck is especially effective in forcing the plow bottoms into the ground or holding them in the ground, as required. A further object of this invention is the provision of a reversible moldboard plow in which the plow bottoms are fixed to a swingable frame structure having front and rear supporting means and arranged so that, when the hitch connection is placed below the axis of swinging movement at the front end of the plow, there is a component of force acting through the frame structure for pushing the plow bottoms into the ground, as an aid when starting up, and for holding the plow bottoms in the ground when the shares become dull in use.

Another feature of this invention is the provision of a reversible plow having its front end supported on a front truck and wherein means is provided for shifting the frame of the plow generally laterally of the front truck so as to accommodate the plow to tractors having different rear wheel spacings. A further feature is to provide a reversible moldboard plow with means for adjusting the lateral position of the frame structure relative to the pivot axis about which the frame structure swings in coupling the plow from one position to another, thereby accommodating the plow to different kinds of tractors.

Further, another feature of this invention is the provision of improved means for fixing the wheels of the truck to the axle thereof and means for adjusting each wheel independently of the other thereby providing a depth and leveling adjustment for the front end of the plow.

A further feature of this invention is the provision of improved means for locking the front wheels of the tractor in adjusted position.

Still further, another feature of this invention is the provision of improved means for fixing the moldboard plow bottoms and their associated coulters to the bar or bars making up the frame structure of the plow. More specifically, it is a feature of this invention to mount the plow bottoms in right and left hand units substantially directly opposite each other, with the associated coulters provided with offset shanks whereby the coulters may be independently connected to the plow frame but arranged directly opposite each other, like the associated plow bottoms. A further feature of the invention is the provision of a single standard secured at its intermediate section to the frame structure and receiving the right and left hand plow bottoms to be carried thereby, in connection with coulters having offset shanks, whereby portions of the shanks may be fixed to the frame structure alongside one another, thereby accommodating independent adjustment of the coulters, the offset portions of the shanks being provided so that the ground engaging sections of the coulters may be mounted on the frame structure directly opposite one another, corresponding to the mounting of the associated plow bottoms.

An additional feature of the present invention is the provision of a power lift device for swinging the frame structure from one position to another. More specifically it is a feature of the invention to provide a rear truck having laterally spaced wheels and connected to oscillate the power lift mechanism in such a way that power for swinging the frame structure is derived, or at least may be derived, from both of the rear supporting wheels simultaneously. In this connection it is an additional feature of the present invention to provide new and improved clutch mechanism arranged to take power from either or both of the rear supporting wheels for swinging the frame structure from one position to another, and also for forcing the plow into operating position. Still further, it is a feature of this invention to provide power lift mechanism whereby the furrow openers may be raised into transport position by backing the plow.

It is also a feature of this invention to provide optionally controlled toothed clutch means for swinging the plow frame from one position to another, the clutch teeth being arranged so that they will automatically disengage when pressure is released on the controlling means, yet the angle of the teeth is such that only a small amount of pressure is required to hold the clutch mechanism in operative position.

These and other objects and advantages of the present invention will be apparent to those skilled in the art after a consideration of the following detailed description of the preferred structural embodiment, taken in conjunction with the accompanying drawings.

In the drawings:

Figure 1 is a plan view of a reversible moldboard plow incorporating the principles of the present invention;

Figure 2 is a side view of the implement shown in Figure 1;

Figure 3 is an enlarged section, taken generally along the line 3—3 of Figure 1, showing the front wheel adjustments;

Figure 4 is a perspective view of one of the saddle castings connecting the plow bottom standards to the frame bars;

Figure 5 is a perspective of one of the saddle castings by which each pair of coulters is fixed adjustably to the plow frame;

Figure 6 is a section taken generally along the line 6—6 of Figure 2;

Figure 7 is a section taken along the line 7—7 of Figure 2;

Figure 8 is a section at a reduced scale taken generally along the line 8—8 of Figure 5;

Figure 9 is an exploded view of the means for holding the front frame spindle in the front truck frame;

Figure 10 is a view of the front end of the reversible moldboard plow shown in Figures 1 and 2;

Figure 11 is a section taken at an enlarged scale along the line 11—11 of Figure 1, showing the clutch of the power lift mechanism;

Figure 12 is a section taken along the line 12—12 of Figure 11; and

Figure 13 is a fragmentary view of the mechanism acting to hold the plow frame in its transport position.

Referring now more particularly to Figures 1, 2 and 10, the reversible moldboard plow, indicated in its entirety by the reference numeral 1, includes a front supporting truck 2, a swingable frame structure 3 carrying the furrow openers, and a rear supporting truck 4.

The supporting means for the front end of the frame structure 3 comprises the front truck 2 which includes a pair of wheels 5 and 6 journaled for rotation on the lower and laterally outwardly directed ends 7 and 8 of a pair of spindles 9 and 10. Each spindle is received within the vertical sleeve section 12 of a wheel casting 13, the latter having a transverse sleeve section 14 slidably mounted on an axle 16, which is preferably square in cross section, as shown in Figure 3. Each sleeve section 14 is extended rearwardly, as at 18, and is formed with a tapered socket 19 in which a wedge pin 21 is disposed. The wedge block or pin 21 is formed at its lower end with a threaded section 23 which is adapted to receive a clamping nut 24. As shown in Figure 1, the forward end of the wedge block 21 is flat, so as to fit snugly against the axle 16 while the opposite or tapered edge is rounded. As best indicated in Figure 3, when the nut 24 is tightened, the wedge block 21 is drawn inwardly of the tapered slot 19 and is forced tightly against the axle 16, thereby securing the wheel casting 13 rigidly to the axle 16. When the nut 24 is loosened, the wedge block 21 may be withdrawn and the wheel casting 13 moved longitudinally of the axle 16 to different adjusted positions, as will be referred to below.

The upper end of each of the spindles 9 and 10 receives a cap member 30 which is formed with a socket 31 having a laterally formed recess 32, access to which is had through a notch 33.

A pin 34 is carried at the upper end of the associated spindle and in mounting the cap 30 thereon, the same is turned so that the pin passes through the notch 33 and into the recess 32. The notch 33 and pin 34 are so mounted that in any normal position of the associated wheel the pin 34 does not ordinarily move into a position adjacent the notch 33.

Each cap member 30 has a laterally forwardly extending bifurcated lug 38 which is apertured horizontally to receive a locking member 39. The latter is provided with a handle 40 and a locking pin 41 (Figure 3) and lies above a flange 43 forged or otherwise formed on an adjusting crank 44 intermediate the handle section 45 and a lower threaded section 46 thereof. The lower end 46 of each adjusting crank 44 is received within a nut 47 disposed in a recess 48 at the upper end of the spindle casting 13. A lug 49 is welded to the nut 48 to prevent the same from turning relative to the spindle casting when the adjusting crank 44 is turned, and hence turning the latter raises or lowers the spindle casting 13 and the axle 16 relative to the associated front wheel. Each of the wheels 5 and 6 is mounted in the manner just described, and hence each end of the axle 16 may be raised or lowered by turning the associated adjusting cranks 44 in one direction or the other. The forged flange 43 of each adjusting crank 44 has a notch 51 formed therein to receive the pin 41 on the associated locking member 39. When the handle 40 thereof is turned to the position shown in Figure 3, the pin 41 is ready to enter the notch 51 after the adjusting crank 44 has been turned through approximately 90 degrees from the position shown, whereupon the handle 40 rotates downwardly, carrying the pin 41 into the notch 51, thereby locking the adjusting crank 44 against rotation. Locking means of this character is simple to manufacture and easy to operate, and effectively prevents jars, vibration and the like from causing the cranks 44 to turn and loosen the desired adjustment. When it is desired to make an adjustment, it is a simple matter to turn the pin 41 out of the associated notch 51, as by swinging the handle 40 over into its other position, and then turning the adjusting crank 44 as desired.

A steering arm 60 is secured, as by welding or the like, at its rear end to the spindle 9 (Figure 3) adjacent the section 7 and extends forwardly and outwardly therefrom, as shown in Figure 1, and a second steering arm 61 is connected in a similar manner to the lower end of the right hand spindle 10. While non-adjustable steering links, as shown at 63a and 64a, in Figure 2, may be used to connect the draft tongue with the steering arms 60 and 61, I may also use the form of steering links shown at 63 and 64 in Figure 1. The steering links 63, 64 are pivotally connected by a bolt 65 at their inner ends to a draft tongue 66. At their outer ends each of the links 63 and 64 is provided with a plurality of holes 68 to receive, respectively, pivot pins 69 and 70 carried at the outer ends of the steering arms 60 and 61. The pins 69 and 70 are removable so as to permit them being placed in any one of the openings 68.

By virtue of this construction, the draft member 66 may be attached to the center of a tractor and then the wheel castings 13 may be adjusted along the front axle 16 to bring the wheels 5 and 6 in the proper position relative to the rear tractor wheels, the pivot pins 69 and 70 being inserted in the proper holes 68. The shiftable connection of the wheel castings 13 and/or the adjustable connection between the steering arms 60 and 61 and the steering links 63 and 64 also makes it possible to adjust the toe-in of the wheels 5 and 6 easily, quickly and conveniently.

The draft tongue 66 consists of upper and lower parallel bars 75 and 76 pivotally connected at their rear ends by a bolt 77 to a part 78 that, in turn, is connected to a central casting or spider 80 for pivotal movement about a horizontal axis, as indicated at 81 in Figure 2. The spider 80 has lateral extensions 83 and 84, there being an opening extending transversely through the spider 80 to receive the axle bar 16. The latter is held in position in the casting 80 by a wedge block 85, substantially identical with the wedge block 21 described above, which extends through a tapered opening in the spider 80 and acting when the nut 86 is tightened to firmly and rigidly secure the spider 80 to the axle bar 16. The spider also includes an upwardly extending arm 88 to which a cable standard 89 is fixed, as by a pair of bolts 90.

Referring again to Figure 1, the frame structure 3 consists generally of one or more bars to which furrow openers are fixed and which is provided with front and rear spindles extending generally longitudinally and which define a generally longitudinal axis about which the frame structure swings from one position to another. One of the frame bars is indicated by the reference numeral 101 in Figure 1 and includes a forward laterally bent section 102 and a rear laterally bent section 103 connected together by a longitudinally disposed central section 104. The frame structure 3 includes a second frame bar 106 which has a laterally directed section 107 at its forward end, a central section 108, the rear portion of which is bent at an angle as indicated at 109, and a rear laterally directed section 110. The frame structure is reinforced by a diagonal brace 112 bolted, as at 114 and 115, to the frame bars 101 and 106. As best shown in Figure 1, the rear laterally directed sections 103 and 110 of the two frame bars 101 and 106 overlap and both extend laterally in the same direction at the rear end of the plow frame. Forwardly of this rear laterally directed frame section, the frame bars 101 and 106 are disposed so that their central sections 104 and 108 extend generally longitudinally in laterally spaced parallel relation while the forward laterally directed sections 102 and 107 extend in opposite directions in overlapping relation. These overlapping forward sections 102 and 107 are braced by a forward U-shaped member 117, one end of which is secured in place by the bolts 114 while the other end is bolted, as at 118, to the forward part of the right hand frame bar 106. As best shown in Figure 1, this provides an easily fabricated but exceedingly strong plow frame.

The front spindle of the frame structure 3 is indicated by the reference numeral 125 in Figures 2 and 10. At its rear end the bar or spindle 125 is permamently secured, as by welding, to a plate 126 which is provided with four holes to receive bolts 127, two disposed on one side of the overlapping frame sections 102, 107, and 117, and two on the lower side, as best shown in Figure 2. The bolts 127 pass through a rear plate 128. Thus, when the bolts 127 are tightened, the plates 126 and 128, together with the spindle bar 125, are firmly and rigidly connected to the frame bars so as to constitute, in effect, an integral part of the frame structure 3. The spindle bar 125 is received within a relatively long sleeve or journal 131 (Figure 2) secured to or forming a part of the central axle spider 80. As shown in Figures 2, 9 and 10, the spindle 125 is held in position in the spindle journal section 131 of the spider 80 by means of a cap 135 which, as best shown in Figure 9, is provided with a transverse tapered recess 136 which is adapted to receive a wedge block 137, the lower end of which is threaded as at 138. The spindle 125 is provided with a transverse notch 139 into which the wedge block 137 extends when the parts are assembled together as shown in Figure 10. When the nut 140 is tightened, the wedge block 137 is drawn within the slot or recess 136 and the notch 139, thereby firmly fixing the cap 135 to the spindle 125. As shown in Figure 10, the draft tongue 75, 76 is connected to the spider 80 at a point well below the axis defined by the front spindle 125. As will be referred to later in detail, providing a hitch in this relation serves to establish a force acting to aid the furrow openers in penetrating the ground when first starting and aiding to hold the furrow openers in the ground, especially when the share points become dull from wear or the like which normally would tend to cause the plow bottoms to run out of the ground.

The rear spindle of the frame structure 3 is, generally, similar to the front spindle 125. As best shown in Figure 1, a pair of plates 145 and 146 are clamped by four bolts 147 on opposite sides of the rear laterally offset overlapping sections 103 and 110 of the frame bars, and a rearwardly extending spindle bar 148, the rear end of which is threaded and receives a clamping nut 149 (Figure 2), is welded or otherwise secured to the plate 146. It will be noted that the front and rear spindles 125 and 148 are disposed generally in parallel relation but that the rear spindle is offset laterally to the left (Figure 1) with respect to the forward spindle 125.

The rear truck 4 comprises two pivotally interconnected parts 154 and 155. The part 154 is in the nature of a spider having a journal or sleeve section 156 rockably receiving the rear frame spindle 148. The spider 154 includes a pair of laterally extending arms 158 and 159 having rearwardly directed apertured lugs 160, and an upwardly extending arm 162 which serves to support a cable standard 163.

The part 155 includes a pair of longitudinally disposed castings 166 and 167, which may be made identical if desired, and each includes a rear axle journal 169 and a bifurcated forward section 171, the latter being apertured to receive pivot bolts 173 by which the two parts 154 and 155 of the rear truck are pivotally connected together for rocking movement about a generally transverse axis as defined by the pivot bolts 173. Thus, the parts 154 and 155 constitute an articulated rear frame for the truck 4. Each of the castings 166 and 167 includes a pad 176 which is tapped or apertured to receive bolt means 177. A pair of straps preferably interconnected at their ends by welding, are connected by the two bolt means 177 to the castings 166 and 167. The lower strap, indicated in Figure 2 by the reference numeral 181, extends directly across from one of the members 166, 167 to the other, while the upper strap 182 lies above the lower strap 181 and is provided with a central section 183 spaced from the lower strap to receive a pair of idler sheaves 184 and 185 (Figure 1) which will be referred to later. A standard 188, comprising a pair of bars 189 and 190, is supported by the transverse connecting straps 181 and 182, the lower ends of the bars 189 and 190 preferably being welded or otherwise secured to the central section 183 of the upper strap 182, the section 183 being connected to the central portion of the lower strap 181 by suitable brace means (not shown) substantially directly underneath the section of the bar 182 to which the lower ends of the bars 189 and 190 are secured. The idler sheaves 184 and 185 are mounted for rotation on bolts 192 which extend through openings in the upper and lower straps 181 and 182.

A through axle shaft 201 is supported for rotation in the journal sections 169 of the castings 166 and 167, and a pair of rear truck wheels 203 and 204 are securely fixed in any suitable manner to the axle shaft 201. Preferably, however, the ends of the axle shaft 201 are provided with notches, like the notch 139 shown in Figure 9, and each rear wheel preferably is provided with a hub, the laterally outer portion of which is provided with a transverse tapered slot to receive a wedge block, like the block 137 shown in Figure 9, whereby each wheel is permanently fixed to the shaft 201.

As best shown in Figure 2, the tools carried by the frame structure 3 includes a pair of right hand furrow openers 206 and a pair of left hand furrow openers 207. Each of the furrow openers comprises a moldboard plow bottom, including a moldboard 210, a share 211 having a point 212, and a frog 213 (Figure 1). The two forward right and left hand plow bottoms are mounted upon a single standard 217 which is generally in the form of an arcuate member. The ends 218 (Figure 1) are fixed to the frogs of the two forward plow bottoms 206 and 207. The central portion of the double armed plow bottom standard 217 is fastened to the associated frame or tool bar 106 by means of a mounting casting member 220, best shown in Figures 1 and 2. The member 220 is generally rectangular in formation and is preferably in the form of a hollow square, as shown in Figure 4, having two slots 221 at one side, extending generally diagonally of the member 220 in alignment, thereby constituting, in effect, one recess, and a second pair of aligned slots 222 on the other side of the member 220 and extending substantially at right angles to the aligned slots 221. The standard 217 preferably is the same size as the central section 108 of the associated frame bar 106 so that either recess 221 or 222 may fit over the frame bar 108, with the other recess receiving the central portion of the plow bottom standard 217. At the corners of the member 220, the latter is provided with reinforced boss sections 224 which are apertured, as at 225, to receive a pair of bolts 226 fixing the member 220 to the frame bar and a second pair of bolts 227 fixing the plow bottom standard to the member 220. A center bolt 229 passes through an opening in the central part of the plow bottom standard 217 and a suitable opening in the frame bar section 108.

The rear pair of right and left hand plow bottoms 206 and 207 are connected to the other frame bar 101 by substantially the same means, and hence the same reference numerals have been applied, since the parts are or may be identical with those just described. Adjacent the rear pair of right and left hand plow bottoms, the frame structure 3 may be further reinforced by a brace 231 connected to the frame bars 101 and 106 by bolts 232 and 233.

The above described construction of plow bottom standards 217 and the associated mounting members 220 makes it possible to adapt one frame structure to different sized plow bottoms, it being understood that for the larger plow bottoms the spacing between plow bottoms laterally must be greater than the spacing for smaller plow bottoms. Therefore, for the larger plow bottoms, the rear mounting member 220 may be disposed on the outside or to the left, as the frame bar 101 of the right hand plow bottom standard 217 or the associated member 220 may be disposed on the right side, or at the left side, of the right hand frame bar 106. For smaller plow bottoms both mounting members 220 and their associated plow bottom standards 217 may be disposed on the inside of the frame bars 101 and 106, or one may be disposed on the inside and the other on the outside, as shown. This particular construction is of special advantage to the manufacturer in that one stock frame size may be used for several different sizes of plow bottoms. Further, in this connection, the attaching plates 146 and 147 by which the rear truck 4 is attached to the laterally outwardly directed section 103, 110, may be shifted laterally of the frame structure 3 so as to bring the rear truck wheel 204 into the desired position relative to the rear furrow bottoms.

It will be seen from Figure 2 that the forward and rear sets of right and left hand plow bottoms are arranged so that the plow bottoms are substantially directly opposite one another relative to the frame structure 3. If the plow is to be equipped with coulters it therefore is desirable to mount the coulters for the right and left hand plows also directly opposite one another. However, where coulters are provided, it is desirable to provide for lateral adjustment and, so far as possible, to use identical parts for both the right and left hand coulter units. According to the present invention, this end is achieved by a particular form of coulter shank and a mounting casting for each pair of coulters which provides for their independent adjustment by securely disposing them in directly opposite positions, relative to the plow frame, corresponding to the opposed mounting of the associated plow bottoms.

Referring now more particularly to Figure 2, I have shown coulter units 236 and 237 for the forward right and left hand plow bottoms 206 and 207. Each coulter unit includes a rotatable disk 241 journaled on an axis 242 carried by a coulter yoke 243. At the end of the pivot 242 the yoke 243 is secured, as by bolt means 245, to a coulter shank 246. Each coulter shank 246 includes a shank section proper, indicated at 247, and an offset yoke receiving section 248, the offset being generally in the plane of the coulter shank.

The pair of coulters for the corresponding pair of right and left hand plow bottoms are arranged, as best indicated in Figure 2, so that the shank sections 247 are spaced apart longitudinally of the plow but with the offset sections 248 disposed in the coulter yokes 243 in such relation that the sections 248, and hence the coulter discs, are directly opposite each other, thereby corresponding to the directly opposite positions of the two plow bottoms 206 and 207 carried by the single standard 217. Each coulter shank is identical and the amount of offset of each section 248 is substantially equal to one-half the width of the coulter shank plus one-half the distance between adjacent edges of the two shank sections 247 fastened to the frame alongside one another. Thus, this construction permits the independent mounting of each coulter shank but, at the same time, provides for the disposition of each coulter disc 241 in exactly the position required.

The two coulters for the rear right and left hand plow bottoms 206 and 207 are of the same construction as just described and hence further description is unnecessary. The same reference numerals have been supplied to the parts of the rear pair of coulters so far as they can be seen in Figure 2. The coulters have been omitted from Figures 1 to 10 for purposes of clarity.

The mounting means for the coulters is especially constructed to secure a firm and ready attachment while, at the same time, permitting each coulter to be adjusted vertically and/or laterally, as required, independently of the companion coulter. Referring now more particularly to Figures 2 and 5 to 8, inclusive, the reference numeral 260 indicates a casting which preferably is disposed on the side of the associated frame bar opposite the side at which the plow bottom standard 217 is mounted. The casting 260 consists of an elongated member having at one side lips 263 and 264 which overlap the upper and lower edges of the associated frame member 117, as best shown in Figure 6. At this side of the member 260, the latter is formed with upper and lower pairs 266 and 267 of lugs which are apertured at 268 and 269, respectively, to receive the associated clamping bolts 270 and 271 disposed, respectively, on the upper and lower sides of the plow frame and extending through the openings 268 and 269.

At the other side, the member 260 is provided with two coulter shank receiving sections, indicated generally by the reference numerals 273 and 274, these sections being defined by end lugs or abutments 276 and 277, a center abutment 278, and two arched or outwardly curved surfaces 281 and 282. The latter are interrupted by center openings 284 and 285 so as to reduce the weight and metal content of the member, and for the same reason the center lug 278 is provided with a central opening 286, whereby the member 260 is made of ample strength yet is not unduly heavy or expensive. As will be seen from Figure 5, both the end abutments 276 and 277 and the center abutment 278 are formed marginally with an inwardly extending curve so that the upper and lower end sections of the abutments lugs extend laterally outwardly of the member 260 further than the central sections.

The two coulter shanks of each pair of coulters 236 and 237 are disposed, respectively, in the coulter shank receiving sections 273 and 274 in the manner indicated in Figures 6 and 7, namely, up against the curved surfaces 281 and 282. A pair of short bars 287, with apertured ends, are placed against the two associated coulter shanks (see Figure 2) and a similar pair of apertured bars 288 are disposed against the outside of the frame bar 106. The bars 287 extend diagonally across the associated coulter shanks, the upper ends of the bars 287 receiving the threaded ends of the upper clamping bolts 270 while the lower ends of the bars 287 receive the lower clamping bolts 271. The outside bars 288 are disposed diagonally and receive the head ends of the bolts 270 and 271.

As best shown in Figure 6, since the coulter shanks 246 are held against the curved surfaces 281 and 282, the shanks may be clamped in different positions by loosening one bolt and tightening the other, thereby swinging the associated coulter shank laterally, as indicated in dotted lines in Figure 6, and disposing the associated coulter disc 241 in the desired lateral position. By loosening both pairs of bolts, the member 260 and both associated coulters may be adjusted longitudinally of the plow frame, and by loosening either pair of bolts the associated coulter may be adjusted vertically, as desired. As will be seen from Figure 6, the abutment lugs 276, 277, and 278 engage the edges of the associated coulter shank even though the latter may be swung in either direction laterally into one of its dotted line positions. As best shown in Figure 8, the member 260 is formed with a pair of lugs 291 and 292 (see Figure 5) substantially opposite the center lug 277 and engageable with the side of the associated frame bar to take the reaction of the clamping bolts extending through the center apertured lugs 266 and 267.

The plow bottoms, according to the present invention, are arranged to be swung or tumbled about the spindles 125 and 148 out of one operating position, into and through their inoperative or transport position, and into the other operating position by power derived from both of the rear truck wheels 203 and 204. Briefly, to this end the rear spindle carries a pulley about which an endless element is carried, the latter also extending over suitable members which may be optionally clutched to the through shaft 201 upon which the wheels 203 and 204 are fixed so that by suitably operating the clutch mechanism, the forward rotation of one or the other, or both, of the wheels 203 and 204 will swing the one or more sets of plow bottoms from one position to another.

Referring now more particularly to Figures 1, 2, 11 and 12, a sheave 301 (Figure 2) is fixed to the rear end of the rear spindle shaft 148 and receives an endless chain 302 which extends from the sheave 301 rearwardly over a pair of idlers 304, around a pair of clutch sheaves 306 and 307 which, as best shown in Figure 11, are mounted for rotation on the through shaft 201, and over the other pair of idlers 184 and 185, referred to above. Each of the above-mentioned sheaves and idlers is provided with chain link engaging sections so as to eliminate slippage and provide for a positive drive. As will be seen from Figure 2, the chain 302 passes over the forward idlers 304 at a point substantially in the pivot axis 173 of the rear truck frame sections 154 and 155 (Figure 1), whereby different angular positions of the rear truck frame sections will have no effect on the transmission of power from the rear wheels 203 and 204 to the plow frame 3. The chain link engaging sections are indicated in Figure 11 by the reference numeral 308, being parts of the clutch sheaves 306 and 307. The latter members have portions 310 and 311 which are chilled to form a hardened surface, and these portions of the members 306 and 307 extend into a clutch housing 314 which is made oil-tight by felt washers 316 or other means. The inner end of each of the members 306 and 307 is formed with clutch teeth 317 and 318, and disposed between the clutch sheaves 306 and 307 is a clutch member 321 mounted for axial shifting movement on the through shaft 201 by means of splines 322, whereby the member 321, while free to slide longitudinally of the axle shaft 201, is constrained to rotate at all times with the latter. The member 321 includes two clutch sections 323 and 324 each having a set of clutch teeth, as indicated at 325 and 326.

Both sets of cooperating clutch teeth 317, 325 and 318, 326 are formed in the manner shown in the right hand portion of Figure 11. The engaging faces of the teeth are angled as indicated at 318a and 326a, the angle of the teeth being such that the teeth will automatically disengage under the transmission of power unless the clutch member 321 is actually held in a position maintaining the teeth 326 in engagement with the teeth 318. However, the angle of the tooth faces is sufficiently small that only a very small amount of force is required to hold the clutch parts in engaged position, no matter how much power is actually transmitted. The casing 314 is oil-tight, as mentioned, and hence there is little likelihood that any substantial changes in the coefficient of friction of the tooth faces 318a and 326a or the relative component of force biasing the clutch member 321 for movement into its disengaged position will occur throughout the life of the implement.

As best shown in Figures 1 and 11, the casing 314 is made into parts, each having lugs 330 which are apertured to receive bolts 331 which hold the casing sections together.

The mechanism for controlling the clutch member 321 includes a transverse shaft 340 mounted for rocking movement in journal bosses 341 and 342 forming a part of or carried by an extension 314a of the clutch casing 314. A pair of arms 344 are welded or otherwise fixed to the shaft 340 and at their outer ends carry studs 345 upon which rollers 346 are mounted for rotation. A bracket 347 (Figures 1 and 12) is fixed to the lower strap 181 and is apertured to receive the lower end of the shaft 340, supporting the latter and holding the housing 314 against rocking. The rollers are disposed in and substantially fill the space between the adjacent spaces of the clutch sections 323 and 324. As clearly shown in Figures 11 and 12, rocking movement of the shaft 340 in one direction or the other acts through the arms 344 and the rollers 346 to shift the clutch member 321 into engagement with one or the other of the clutch sheaves 306 and 307. By this means the plow frame may be swung or tumbled from one position to another by power derived from the rear truck wheels 203 and 204.

The clutch member 321 is adapted to be controlled by the operator of the tractor propelling the plow 1. To this end, the shaft 340 (Figure 2) is supported in a generally upwardly and rearwardly inclined position (Figure 2) and is received within a bracket 351 fixed to the rear truck standard 188 by bolts 352 or other suitable means. At its upper end the clutch shaft 340 carries a double armed lever 353, suitably fixed to the shaft 340 by a nut 354. Cables 356 and 357 are secured at their rear ends to the lever 353 and extend forwardly through tubes 358 and 359, the rear ends of which are supported upon the upper and outwardly flared ends of the cable standard 163, which preferably consists of two strap members 361 and 362 as shown in Figures 2 and 9, with outwardly flared upper ends 361a and 362a. The forward ends of the cable tubes 358 and 359 are supported in a cross bar 365 carried at the upper end of the standard 89 described above in connection with the front truck 2.

The cable standard 89 at the front end of the plow also supports a crank rod 367 which, at its rear end, is connected by a universal joint 368 to the front end of a rod 370 that is threaded at both ends, as indicated at 371 and 372. Each threaded end of the rod is received within a suitable trunnion 373 and 374, the former being carried at the upper end of the standard bars 189 and 190 (Figure 2) and the other being carried at the upper end of the cable standard bars 361 and 362. See also Figure 1. By turning the crank 367, the position of the rear truck frame section 155 relative to the section 154 may be adjusted, thereby raising or lowering the rear end of the plow frame. The plow may be leveled by turning one or the other of the crank screws 44 at the front end of the plow.

At the front end of the plow, the plate 126 carries an extension 126a to which the central portion 381 of a curved rod 382 (Figure 10) is secured, as by welding or the like. The rod or member 381 has wings 384 and 385 which are formed generally arcuately about the axis of the front spindle 125. The upper arm 88 of the the spider 80. Thus, when the plow frame is vided with a journal section 387 in which a pivot bolt 388 is disposed. The latter receives the forward ends of a U-shaped strap member 390 to the rear of which a stud 391 carrying a roller 392 is fixed. As shown in Figure 2, the roller 392 rides on the curved member 382. As best shown in Figures 2 and 13, a bracket 395 is fixed to the arm 390 and receives a relatively heavy spring 396, the lower end of which is anchored to a lug 397 carried by or mounted on the spider 80. Thus, when the plow frame is swung about the spindles 125 and 148 into a position in which both sets of right and left hand plow bottoms are disposed horizontally above the frame, the spring 396 pulls the roller 392 into the intermediate section or recess 381 in the cam member 382, and thereby acts to hold the plow in transport position with both sets of plow bottoms out of engagement with the ground.

The extension 126a of the plate 126 is provided with a stop lug 401 (Figure 10) which is welded or otherwise fixed thereto, and the spider 80 is provided with tapped bosses to receive a pair of adjusting set screws 402 and 403, the latter being disposed in a position to receive the stop lug 401 in either operative position of the plow frame. Figure 10 shows the right hand plow bottoms in operating position with the stop lug 401 up against the set screw or cooperating stop 402. When the plow frame is swung to the other position so that the left hand plow bottoms 207 work the ground, the stop lug 401 moves over against the other set screw 403. The set screws 402 and 403 may be turned to different positions for governing the position of the plow frame relative to the front truck.

The operation of the reversible moldboard plow described above is believed to be apparent. The operative position of the plow for throwing right hand furrow is shown in Figures 1, 2 and 10. It will be observed from Figure 2 that the draft as applied to the plow frame by the draft tongue 75 is at a point below the spindle 125. As will be clear from Figure 1, where the rear truck 4 is shown disposed laterally with respect to the plow bottoms and the main body of the frame 3, the application of the draft force to the frame below its forward pivot axis 125 gives rise to a component of the draft force which is effective in tending to swing the right hand plow bottoms 206 forward and into the ground; in other words, the effect of the draft force results in forcibly and positively holding the frame 3 in its operative position, with the lug 401 (Figure 10) against the set screw 402. This action will be apparent by noting from Figure 1 that the rear truck frame is displaced to the left, and hence if the frame 3 were free to swing through an entire revolution, and if it should so swing until it reached a state of equilibrium, the rear end of the frame would occupy a lower position than the forward end, due to the lateral position of the rear truck as shown in Figure 1, and in this event the front truck would be tilted upwardly and backwardly from the position shown in Figure 2. This would cause the portion of the front truck below the pivot 125 to be displaced forwardly, and since this is the direction of the draft force and its point of application, it will therefore be seen that the effect of the draft force as applied by the draft tongue 75 is to hold the frame 3 in operative position with the lug 401 against the stop or set screw 402 so long as the right hand plow bottoms 206 are in ground engaging position. When the frame is swung to the other position, with the left hand plow bottoms 207 in ground engaging position, the reverse is true, namely, the draft force acts now to hold the frame 3 in its other position, with the lug 401 up against the set screw or stop 403.

This is an important feature of the present invention. First, this action aids the plow bottoms in penetrating the soil when first starting up, and second, as is probably more important, it aids to hold the plow bottoms in the ground to the proper depth even though the points should become quite dull. This problem is not encountered with disk plows, since the disks are always relatively thin members and hence, even when not very sharp, the disks generally penetrate satisfactorily without requiring that a component of the draft force be applied to forcibly hold the plow disks in the ground. On the other hand, where moldboard plow bottoms are employed, the points may possibly become so dull as to cause the plow to ride out of the ground regardless of the normal action of the soil against the curved share and moldboard, whereupon it becomes exceedingly important to provide some means for diverting, in effect, some of the draft force to hold the plow bottoms at the proper depth. Obviously, of course, an increase in the amount of draft applied to the implement does not cause the plows to run too deep since the swinging movement of the plow frame 3 is limited by the stops 402 and 403, yet a component of draft force is always available to hold the plow frame in proper operating position.

When it is desired to swing the plow from one position to the other a pull is exerted on the proper cable 366 or 367. This swings the clutch shaft 340 and moves the slidable clutch member 321 into engagement with one or the other of the clutch sheaves 306 and 307, whereupon the rotation of the shaft 201 is transmitted to the selected sheave and the rolling of the rear wheels is thus transmitted to the chain 302. This swings or tumbles the frame in the desired direction. Due to the inclination of the coacting clutch faces 318a and 326a, the force transmitted acts to disengage the clutch member 321, hence it is necessary to maintain a pull on the cable. However, the amount of pull is quite small under practically all operating conditions, yet the clutch will immediately disengage when the cable is released. Usually no more force is required to hold the clutch engaged than can be exerted by one finger. If it is desired to hold the frame in transport position, the operator releases the pulled cable when the frame is in its intermediate position, whereupon the spring 396 moves the roller 392 into the notch or depression 381. If it is desired to swing the plow into its other position, the pull on the cable is continued or reestablished, whereupon the power derived from the rear truck wheels 203 and 204 swings the plow into its other position. When it is desired to move the plow out of its other position and back into the first position or into a transport position, the opposite cable is pulled, as will be readily understood. When the plow reaches either of its operative positions, it is forcibly held in that position by the effect of the forward draft, as mentioned above.

It will be observed that power from either or both of the rear wheels 203 and 204 is available to swing the plow bottoms from one position to another. This is an important part of the present invention since it may possibly occur that only one wheel will have traction, in which event power from the other wheel will still be available to operate the swinging mechanism. Further, power from the rear wheel or wheels is always available to actually swing the plow bottom into operative position, whereas in some prior plow constructions with which I am familiar, only the action of gravity was relied upon to cause the plow bottoms to drop into operative position. This feature of the present invention is especially advantageous where it is necessary to move the plow to working position on the uphill side of an incline. Still further, the present invention permits the plow bottoms to be raised to transport position by backing the plow. That is, by backing the plow and pulling on the opposite cable, the plow bottoms can be raised. This is an important feature of the present invention, in that if the load should become so heavy on the tractor that the latter is about to stall, the tractor may be reversed and the plow bottoms raised by backing the tractor and the plow, whereas if only forward movement of the plow were available to raise the plow bottoms, it can be seen that this additional load of the tractor might stall same, leaving the implement in such a condition that it can neither be moved forwardly due to the heavy going encountered nor can the tools be raised so as to lighten the load.

The plow can be leveled fore and aft by turning the crank 367 to raise and lower the rear end of the tractor frame, and the front end of the plow may be leveled laterally by adjusting the set screws 402 and 403, and also by the crank screws 44, which may also be used to raise and lower the front end of the plow frame. The cable tubes 358 and 359 support the cables 356 and 357 in a position entirely out of the way of the plow bottoms 206 and 207, and hence there is no danger of the cables catching on the plow bottoms during the movement of the latter from one position to another. The coulters 236 and 237 may be adjusted laterally so that the discs 241 sever the furrow slices in the manner desired, by loosening one of each pair of attaching bolts and tightening the other, and the lateral position of the front truck 2 relative to the frame 3 may be adjusted to accommodate different tractors by loosening the bolts 127 and shifting the frame relative to the front plate 126. When this adjustment is completed, both right and left hand plow bottoms will operate to throw the forward slice into the previously opened furrow. The toe-in of the wheels 5 and 6 may be adjusted by shifting the wheel castings 13 along the axle shaft 16 or by inserting the pins 69 and 70 in different holes 68 in the steering links 63 and 64. Likewise, the position of the wheels 5 and 6 relative to the tractor may be adjusted in this manner where necessary. Ordinarily, however, there is considerable latitude tolerated so far as the position of the front wheel in the furrow is concerned, and hence ordinarily the wheels 5 and 6 need not be adjusted for the ordinary farm tractor. The position of the rear truck 4 may be adjusted laterally on the frame extension 103, 110 by loosening the bolts 147 and shifting the plates 145 and 146 to the desired position. Ordinarily, this is to provide for furrow openers of different size and this adjustment is usually made during the manufacture of the plow. However, if for any reason the farmer should desire to change the furrow openers, as may be done conveniently by virtue of the mounting castings 220 (Figure 4), he is also enabled conveniently and easily to make the corresponding adjustment in the position of the rear truck 4.

While I have shown and described the propelled structure in which the principles of the present invention have been embodied, it is to be understood that my invention is not to be limited to the particular details shown and described above, but that, in fact, widely different means may be employed in the practice of the broader aspects of my invention.

What I claim, therefore, and desire to secure by Letters Patent is:

1. A reversible moldboard plow comprising a front support, a frame structure connected therewith for rotation about an axis, right and left hand plow bottoms carried by said frame structure, a laterally offset section carried at the rear of said frame structure and extending laterally in a landward direction beyond the plow bottoms, a rear wheeled truck, and means connecting said offset section with the rear truck for rotation relative thereto about an axis generally parallel to but spaced to the landward side of the plow bottoms.

2. A plow comprising a generally longitudinally extending frame structure having a first spindle section at its forward end and a laterally directed extension at its rear end carrying a second spindle section, right and left hand furrow opening means carried by said frame structure forwardly and laterally of said lateral extension, front supporting means including a longitudinally disposed bearing in which the front spindle portion is journaled for rotation, and rear supporting means including a bearing in which the rear spindle portion of said frame structure is journaled.

3. A plow as defined in claim 2, further characterized by said frame structure including a pair of generally longitudinally extending laterally spaced bars the rear ends of which are bent laterally and fastened together in overlapping relation to form a laterally extended rear wheel receiving section.

4. A plow as defined in claim 2, further characterized by said rear spindle portion being offset laterally with respect to said front spindle section when the plow is in operating position, and said right and left hand furrow openers being fixed to said frame structure at one side of the line joining said front and rear spindle sections, whereby said frame may be swung from one position to the other without raising the plow to transport position.

5. An agricultural implement comprising a generally longitudinally disposed frame structure having a spindle portion at its forward end and another spindle portion at its rear end, means for swinging said frame structure about an axis defined by said spindle portions from one position in which the frame structure is generally horizontal to another position, said spindle portions extending generally longitudinally, front supporting means rockably receiving the front spindle, rear supporting means rockably receiving said rear spindle, a moldboard plow bottom fixed to said frame structure and operatively disposed in plowing position when the latter is in a generally horizontal position, said rear spindle portion being disposed at one side of the axis of said front spindle portion and said moldboard plow bottom being disposed on said frame structure generally at the other side of said front spindle axis, and means providing a hitch connection with said front supporting means acting against the latter at a point below said front spindle section, whereby when the share of said moldboard plow bottom is dull, the draft force exerted against said frame structure also acts against the latter tending to swing the same about said front and rear spindle portions so as to hold said plow bottom against working out of the ground.

6. A moldboard plow comprising front and rear supporting means, a frame structure rockably supported thereon for swinging movement about a generally longitudinal axis relative to said front supporting means, said rear supporting means normally being disposed generally at one side of said axis, a moldboard plow bottom fixed to said frame structure so as to be disposed generally at the other side of a line connecting said front and rear supporting means, a hitch connected to said front supporting means normally below said axis whereby the draft transmitted through said hitch connection exerts a tendency to hold the moldboard plow bottom in the ground, and stop means limiting the swinging movement of said frame structure.

7. A moldboard plow as set forth in claim 6 further characterized by the provision of adjustable stop means carried by the front supporting means and engageable with portions of the frame structure for limiting the rocking movement of the latter.

8. A reversible moldboard plow comprising a front support, a frame structure connected therewith for rotation about an axis, right and left hand plow bottoms carried by said frame structure, and a rear wheeled support connected with the rear end of said frame structure to accommodate swinging movement of the latter about said axis relative to said front support, said rear wheeled support comprising a part fixed to the rear end of said frame structure, a second part connected with said first part and extending substantially horizontally rearwardly from said first part, and ground wheel means connected with the rear end of said second part, the latter extending rearwardly a distance sufficient to dispose said wheel means wholly rearwardly of said bottoms, whereby movement of said second part serves to adjust the operative position of the rear portion of the plow.

9. A tractor propelled reversible plow comprising front supporting means adapted to be connected with the tractor, a frame structure having rear supporting means, means connecting the front end of said frame structure with said front supporting means providing for a swinging movement of said frame structure about a generally longitudinal axis from one position to another, right and left hand plow bottoms carried by said frame structure, and means adjustably fixing said front connecting means with said frame structure so as to provide for adjusting the lateral position of the latter relative to the axis of swinging movement thereof so as to accommodate the plow to tractors having different rear wheel spacings whereby the laterally outer plow bottom will operate to throw a furrow slice into the furrow in which the adjacent rear wheel of the tractor runs.

10. A reversible plow as defined in claim 9, further characterized by means fixing the rear support in various lateral positions relative to the rear end of said frame structure.

11. A reversible plow of the type adapted to be propelled by a tractor, one wheel of which runs in the last furrow opened on the previous round, said plow comprising a generally longitudinally extending frame structure, furrow opening means carried thereby, said frame structure being swingable about a generally longitudinal axis so as to throw the furrow slice in one direction or the other, a front support for said frame structure comprising an axle, means carried thereby for rockably receiving and supporting the front end of said frame structure, adjusting means associated therewith so as to dispose the furrow opening means in a position to open a furrow and throw the furrow slice in the furrow along which the adjacent wheel runs, wheel means carried at each end of said axle, one of said wheel means running in the furrow behind the associated tractor wheel, and means for adjusting the position of each wheel means upon said axle so as to accommodate tractors having different wheel spacings.

12. In a plow, the combination of an axle shaft, a member having a first sleeve section receiving said axle shaft and shiftable therealong, said sleeve section having a tapered slot opening into the interior thereof, a wedge block disposed in said tapered slot and having a threaded end extending outwardly of said sleeve section at the smaller end of the block, a nut threaded onto said threaded portion for drawing said wedge block within said slot to clamp said sleeve section in adjusted position along said axle shaft, said member having a vertical sleeve section, and a wheel spindle journaled for swinging movement in said second sleeve section.

13. In a plow, the combination of an axle shaft, a vertically disposed sleeve section fixed to said shaft, a wheel spindle swingably mounted in said sleeve section, a spindle cap connected with the upper portion of said wheel spindle and having a laterally extending lug, an adjusting crank having one end threadedly connected with said sleeve section and another portion connected with said spindle cap, means for holding said adjusting crank against longitudinal movement in said cap, and means carried by said lug and engageable with said adjusting crank for locking the latter against rotation, thereby holding said wheel spindle in adjusted position in said axle carried sleeve section.

14. A reversible moldboard plow comprising front and rear support, a frame structure rockably mounted on said supports for swinging movement about a generally longitudinal axis from one position to another, said frame structure including a frame bar, a substantially square saddle casting fixed to said frame bar and having a diagonal slot on each side, there being an aperture at each corner of said casting extending into the end of the associated slot, one of said slots forming a frame receiving section and the other a standard receiving section, a plow bottom standard disposed in said other slot in the saddle section and said one slot receiving a part of said frame structure, there being apertures in said standard and said part of the frame structure, and two pairs of fastening means, one pair fixing said standard to said saddle casting in one slot thereof and the other pair fixing said saddle casting to said frame part with the latter disposed in the other slot.

15. A reversible plow comprising front and rear supports, a frame structure rockably mounted in said supports for swinging movement from one position to another, right and left hand plow bottoms carried by said frame structure, a pair of coulters, one disposed adjacent each of said right and left hand plow bottoms, each coulter having a shank, and means adjustably fixing each coulter shank to said frame structure independently of the other.

16. In a reversible plow, a frame structure including a frame bar, right and left hand furrow openers mounted in opposite relation on said frame bar, a pair of coulters for said oppositely mounted furrow openers, each of said coulters having a shank, a member disposed at one side of said frame bar between the latter and both of said coulter shanks, said member having spaced sections about which said shanks are adapted, respectively, to rock, said member having bolt receiving means, and means for clamping said shanks and said member to said frame bar, comprising clamping members on the outer side of said bar and the outer sides of said shanks, and bolt means connecting said clamping means and extending through said bolt receiving portions of said member.

17. A coulter shank saddle casting for reversible plows and the like having a frame bar and a pair of coulters, each coulter having a shank, said saddle casting comprising a main body portion having a pair of shank receiving sections about which each shank may rock independently of the other, and marginal sections adapted to embrace and engage portions of a plow frame bar.

18. A coulter shank casting as set forth in claim 17, further characterized by apertured lugs at opposite sides of the casting for receiving clamping bolt means.

19. A reversible plow comprising a truck having a pair of laterally spaced wheels and an axle driven by both of said wheels, a frame structure mounted on said truck for rocking movement from one position to another about a generally longitudinally extending axis, and an optionally operable driving connection between said axle and said frame structure for causing the latter to swing from one position to another about said longitudinal axis at the same time said axle is rotated by said wheels, said driving connection serving to limit the rate of swinging to that comparable to the rotation of said axle.

20. A reversible plow comprising a frame structure swingable from one position to another, a truck supporting at least one end of said frame structure for swinging movement and comprising a pair of laterally spaced wheels, an axle shaft, and means fixing said wheels to said shaft, a pair of clutch members mounted on said shaft for rotation relative thereto, means connecting said clutch members with said frame structure whereby rotation of one of said members in one direction swings said frame structure in one direction and rotation of the other clutch member in the same direction swings said frame structure in the opposite direction, and a shiftable clutch member rotatable with said shaft and shiftable axially thereof to connect one or the other of said rotatable clutch members with said axle shaft for rotation therewith so as to swing said frame structure from one position to another about said longitudinal axis at the same time that said axle shaft is rotated and at a rate proportional to the rate of rotation of said axle shaft.

21. A reversible plow as defined in claim 20, further characterized by a sheave fixed to rotate with said frame structure, each of said rotatable clutch members including a sheave, and a flexible member trained over said sheaves to transmit power from said wheels to said frame for swinging the latter from one position to the other at the same time that said axle shaft is rotated.

22. A reversible plow comprising a generally longitudinally extending frame structure swingably mounted for movement about a generally longitudinally extending axis, supporting means for the rear end of said frame structure comprising a pair of relatively pivotally movable members pivotally connected together for relative rocking movement about a generally transverse axis, adjusting means fixing said members against relative movement, one of said members being connected with said frame structure to accommodate the swinging movement thereof, a through axle shaft carried by the other member, a pair of ground engaging wheels fixed to the ends of said axle shaft whereby either or both wheels may rotate the shaft during travel of the plow either forwardly or rearwardly, a sheave fixed to rotate said frame structure, an idler sheave carried on said other member, a pair of clutch sheaves rotatably mounted, an endless force transmitting element disposed over said first mentioned sheaves and said clutch sheaves, and means driven by said axle shaft as either one or both of said wheels rotate for optionally connecting one or the other of said clutch sheaves for rocking said frame structure about said generally longitudinally extending axis, rotation of said shaft in either direction serving to swing said frame structure from one position to the other by connecting one or the other of said clutch sheaves to said optionally controlled member.

23. A plow as defined in claim 22, further characterized by a double armed lever connected with said optionally controlled member for moving the latter in one direction or the other, and cables connected to the ends of said double armed lever for shifting said optionally controlled member in one direction or the other.

24. A plow as defined in claim 22, further characterized by said optionally controlled member being splined on said axle shaft for rotation therewith and axial shifting movement relative thereto, said optionally controlled member having two sets of clutch teeth, there being a cooperating set of clutch teeth on each of said clutch sheaves, swinging movement of said double armed lever in one direction or the other causing said shiftable clutch member to bring one of its sets of clutch teeth into engagement with the teeth on the associated clutch sheave, each set of teeth being angled so that the teeth normally move into disengaged position unless said double armed lever is held positively in one or the other of its positions.

25. A reversible plow comprising a frame structure swingable about a generally longitudinal axis from one position to another, supporting means for said frame structure accommodating said swinging movement and including a rear truck carrying a member upon which the rear end of said frame structure is mounted for rocking movement, a through axle connected for rotation with said member, a pair of ground engaging wheels mounted on said through axle, a cam member fixed to rotate with said frame structure and having a recessed section, a biased member carried by said supporting means and engageable in said recessed section for yieldingly holding said frame structure in an intermediate position, a pair of rotatable members carried by said axle shaft and operatively connected when driven in one direction or the other to swing said frame structure from one position to another, a shiftable clutch member slidable on said axle shaft but rotatable therewith whereby, when engaged with one or the other of said rotatable members, said frame structure is swung from one position toward the other position, and means for holding said axially shiftable member in a position engaged with one or the other of said rotatable members for maintaining clutching engagement therewith until said frame structure has been swung from a working position into its intermediate position and said biased member enters said recessed section for yieldingly holding the frame structure in its intermediate position.

26. In an agricultural implement, tool means adapted to be raised and lowered, a driving member having clutch teeth, a driven member operatively connected with said tool means to raise and lower the same and having clutch teeth adapted to be engaged with said first mentioned clutch teeth, and means for shifting one of said members into and out of engagement with the other member, said clutch teeth being so angled that when power is transmitted from the driving clutch member to the driven clutch member to raise said tool means there is a component of force tending to separate said clutch members, the angle of said teeth being sufficiently small that only a small amount of force is required to hold the clutch members in engagement and said angle being sufficiently large that when said last mentioned means is released, said clutch members are disengaged irrespective of the amount of force transmitted.

27. In an agricultural implement, an axle structure having a generally vertically disposed spindle receiving section, a wheel spindle disposed therein, a cap member carried at the upper end of said spindle and having a slot formed therein, a crank screw threaded into said sleeve section and having a flange disposed in said slot, and means carried by said slotted section of the cap member for engaging said flange and locking said crank screw against rotation.

28. A moldboard plow comprising front and rear supporting means, a frame structure rockably supported thereon for swinging movement about a generally longitudinal axis relative to said front supporting means, said rear supporting means normally being disposed generally at one side of said axis, a moldboard plow bottom fixed to said frame structure, and a hitch connected to said front supporting means normally below said axis whereby the draft transmitted through said hitch connection exerts a tendency to hold the moldboard plow bottom in the ground.

29. A plow comprising front supporting means, a frame structure rockably supported thereon for swinging movement about a generally longitudinal axis relative to said front supporting means, rear supporting means for said frame structure, means connecting the latter with the rear supporting means for movement relative thereto about an axis at one side of said longitudinal axis, a furrow opener fixed to said frame structure at a point thereon at one side of the axis of rocking of the frame structure on said rear supporting means, and a hitch connected to said front supporting means normally below said axis whereby the draft transmitted through said hitch connection exerts a tendency to hold the furrow opener in the ground.

30. A reversible moldboard plow comprising a front support, a frame structure connected therewith for rotation about an axis, right and left hand plow bottoms carried by said frame structure, a laterally offset section carried at the rear of said frame structure, a rear wheeled truck connected with said section and comprising a pair of laterally spaced ground wheels, one of which is arranged to run in the furrow opened by the adjacent bottom and the other wheel being disposed to run on the unplowed land, and means connecting said offset section with the rear truck for rotation relative thereto about an axis disposed substantially midway between ground wheels and to the landward side of said bottoms.

31. A plow comprising a truck having a pair of laterally spaced wheels and an axle driven by both of said wheels, means shiftably connected with said truck for movement relative thereto about a longitudinal axis, a sheave fixed to said means, a pair of sheaves on said axle, a single flexible element trained over said sheaves, and a clutch for optionally connecting either of said pair of sheaves with said axle whereby rotation of the latter acts through said first sheave and said flexible element for shifting said means from one position to another about said axis.

32. A reversible plow comprising a generally longitudinally extending frame structure swingably mounted for movement about a generally longitudinally extending axis, supporting means for the rear end of said frame structure comprising a pair of relatively movable members pivotally connected together for relative rocking movement about a generally transverse axis, one of said members being connected with said frame structure to accommodate the swinging movement thereof, a through axle shaft carried by the other member, a pair of ground engaging wheels fixed to the ends of said axle shaft whereby either or both wheels may rotate the shaft during travel of the plow, a pair of optionally operable clutches driven from said axle shaft, and operative connections from said clutches to said frame whereby rotation of said shaft serves to swing said frame structure from one position to the other, said connections being disposed adjacent the pivot axis between said relatively movable supporting members, whereby movement of said axle shaft may swing said frame structure irrespective of the position of one of said supporting members relative to the other.

33. A reversible plow as defined in claim 32, further characterized by means to move one of said supporting members relative to the other about said pivot axis.

34. A reversible plow comprising a frame structure swingable about a generally longitudinal axis from one position to another, supporting means for said frame structure accommodating said swinging movement and including a member upon which said frame structure is mounted for rocking movement, a cam member fixed to rotate with said frame structure and having a recess with slanting walls, a biased member carried by said supporting means and engageable in said recess for yieldingly holding said frame structure in an intermediate position against swinging movement, and power actuated means for swinging said frame structure in either direction out of said intermediate position, said slanting walls providing for movement of said biased member out of said recess when said power actuated means swings said frame structure.

35. A reversible plow as defined in claim 34, further characterized by said cam and biased member being arranged to hold said frame structure in an intermediate position, and power actuated means for swinging said frame structure out of said intermediate position into a working position.

36. A reversible plow as defined in claim 34, further characterized by said cam and biased member being arranged to hold said frame structure in an intermediate position, and said frame structure being adaptable to be swung in one direction or the other out of said intermediate position into either of two optional working positions, and power means including rotatable ground engaging means and optionally operable connections therefrom to said frame structure for swinging the latter into and out of its intermediate position.

37. A frame for a reversible plow, comprising a pair of frame bars extending longitudinally parallel for the major portion of their length, each bar having a laterally directed section and said laterally directed sections overlapping and means at the front and rear ends of said frame secured to said overlapping sections to form rocking supports for said frame bars.

38. A frame for a reversible plow, comprising a pair of frame bars extending longitudinally parallel for the major portion of their length, the forward ends of said frame bars being bent laterally inwardly in overlapping relation and the rear ends of said frame bars being bent in the same direction and extending laterally outwardly at one side of the frame in overlapping relation.

39. In a reversible plow, a frame comprising a pair of frame bars extending longitudinally parallel for the major portion of their length, the forward ends of said frame bars being bent laterally inwardly in overlapping relation and the rear ends of said frame bars being bent in the same direction and extending laterally outwardly at one side of the frame in overlapping relation, and front and rear rocking supports fixed to and adjustable laterally along the overlapping sections, respectively, of said frame.

40. In a reversible plow, rear supporting means, a frame comprising a first plow bottom receiving section that extends longitudinally rearwardly and a second section that extends substantially at a right angle to said plow bottom receiving section at the rear end of the latter and laterally outwardly thereof, and means connecting said laterally extending section of the frame to said supporting means for rocking movement relative thereto, the axis of rocking movement extending to one side of said plow bottom receiving section.

41. The invention as defined in claim 40, further characterized by rear supporting means connected with said second frame section for rocking movement about an axis spaced laterally from said longitudinal axes a distance such that, when the frame is swung into a position to raise the plow bottoms into their transport position, the frame parts and plow bottoms are disposed wholly above the axis of rocking movement at the rear supporting means.

42. An agricultural implement comprising a tool supporting beam, ground working tool means carried thereby, supporting means for the front portion of said beam and on which the latter is supported for rocking movement about a generally longitudinal axis, the rear portion of said beam being disposed laterally of said axis, supporting means for said rear portion accommodating rocking movement of said beam about said axis, said tool means being disposed at the other side of a line connecting said front and rear supporting means, and means providing a hitch connection with said front supporting means acting against the latter at a point below said axis whereby the draft force exerted against said beam through said front supporting means acts to tend to swing said beam in a direction to hold said tool means in the ground.

43. An agricultural implement as defined in claim 42, further characterized by cooperating means on said beam and said front supporting means for limiting the movement of said beam relative to said front supporting means in said one direction.

44. A tractor propelled reversible plow comprising front supporting means adapted to be connected with the tractor, a frame structure, means connecting the front end of said frame structure with said front supporting means providing for a swinging movement of said frame structure about a generally longitudinal axis from one position to another, right and left hand furrow opening means carried by said frame structure, and means adjustably fixing said front connecting means with said frame structure so as to provide for adjusting the lateral position of the latter relative to the axis of swinging movement thereof so as to accommodate the plow to tractors having different rear wheel spacings whereby the laterally outer furrow opening means will operate to throw a furrow slice into the furrow in which the adjacent rear wheel of the tractor runs.

45. In a plow having a frame bar and a standard, a saddle casting adapted to be fixed to said frame bar and having a diagonal slot on each side, there being an aperture at each corner of said casting extending into the end of the associated slot, one of said slots forming a frame receiving section and the other sandard receiving station, said standard being adapted to be disposed in said other slot in the saddle section and said one slot being adapted to receive said frame bar, said apertures being adapted to receive fastening means for fixing the saddle casting to said standard and frame bar.

46. In a reversible plow, a frame structure including a frame bar, right and left hand furrow openers mounted in opposite relation on said frame bar, a pair of coulters for said oppositely mounted furrow openers, each of said coulters having a shank, a member disposed at one side of said frame bar between the latter and both of said coulter shanks, said member having spaced sections about which said shanks are adapted, respectively, to rock, and means for clamping said shanks and said member to said frame bar.

47. A coulter shank saddle casting for reversible plows and the like having a frame bar and a pair of coulters, each coulter having a shank, said saddle casting comprising a main body portion having a pair of shank receiving sections about which each shank may rock independently of the other about an axis extending generally longitudinally of said frame bar.

48. A reversible plow comprising a generally longitudinally extending frame structure swingably mounted for movement about a generally longitudinally extending axis, supporting means for the rear end of said frame structure comprising a pair of relatively movable members pivotally connected together for relative rocking movement about a generally transverse axis, a pair of standards fixed, respectively, to said members, and adjusting means connected between said standards for adjusting the relative position of said members, one of said members being connected with said frame structure to accommodate the swinging movement thereof.

49. A rear end construction for plows and the like having a frame, comprising a first part connected with the rear end of said frame, a second part including a pair of laterally spaced sections swingable together about a generally transverse axis relative to said first part, axle means carried by said laterally spaced sections, a pair of wheels connected with said axle sections, and means acting between said first and second parts for simultaneously adjusting the position of both wheels relative to said first part and said frame.

50. A rear end construction for reversible plows and the like having a frame, comprising a first part connected with the frame to accommodate swinging movement of the latter about a generally longitudinal axis, wheel means connected therewith, and means deriving energy from the rotation of said wheel means for swinging said frame about said generally longitudinal axis.

51. An agricultural implement as defined in claim 42, further characterized by cooperating means on said beam and one of said front and rear supporting means for limiting the movement of said beam in one direction.

52. A tractor propelled reversible plow comprising front supporting means adapted to be connected with the tractor, said front supporting means comprising axle means and laterally adjustable front furrow wheel means connected therewith, a frame structure, right and left hand furrow opening means carried by said frame structure, and means connecting the front end of the frame structure with said front supporting axle providing for a swinging movement of said frame structure about a generally longitudinal axis and also accommodating the adjustment of the lateral position of the frame structure relative to the axis of swinging movement, the adjustment at said front furrow wheel relative to the axle and the adjustment of the frame structure relative to its longitudinal axis of swinging movement serving to adjust the plow to tractors having different rear wheel spacings whereby the laterally outer furrow opening means will operate to throw a furrow slice into the furrow in which the adjacent rear wheel of the tractor runs.

53. An agricultural implement comprising front and rear supporting means, a frame structure connected therewith for rotation about a generally longitudinal axis, tool means carried by said frame structure, a laterally offset section at the rear of said frame structure and extending laterally beyond said tool means, and means connecting said offset section with the rear supporting means for rotation relative thereto about said axis, the latter extending generally longitudinally of the frame structure and disposed entirely to one side of said tool means.

CARL G. STRANDLUND.